US011109402B2

(12) United States Patent
Xiang et al.

(10) Patent No.: US 11,109,402 B2
(45) Date of Patent: Aug. 31, 2021

(54) SCHEDULING REQUEST TRANSMISSION METHOD AND APPARATUS (71) Applicant: HUAWEI TECHNOLOGIES CO., LTD., Guangdong (CN)

(72) Inventors: Gao Xiang, Chengdu (CN); Huang Huang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 91 days.

(21) Appl. No.: 16/588,582

(22) Filed: Sep. 30, 2019

(65) Prior Publication Data

US 2020/0029351 A1  Jan. 23, 2020

Related U.S. Application Data (63) Continuation of application No. PCT/CN2018/080402, filed on Mar. 24, 2018.

(30) Foreign Application Priority Data

Apr. 1, 2017 (CN) .......................... 201710214559.8

(51) Int. Cl.
*H04W 72/12* (2009.01)
*H04W 76/36* (2018.01)
(Continued)

(52) U.S. Cl.
CPC ..... *H04W 72/1268* (2013.01); *H04W 68/005* (2013.01); *H04W 72/046* (2013.01); *H04W 76/36* (2018.02)

(58) Field of Classification Search
CPC ..... H04L 5/0023; H04L 5/0053; H04L 5/008; H04L 5/0091; H04B 7/0695; H04B 7/088;
(Continued)

(56) References Cited

U.S. PATENT DOCUMENTS

2014/0004898 A1  1/2014 Yu et al.
2014/0016620 A1  1/2014 Singh et al.
(Continued)

FOREIGN PATENT DOCUMENTS

CN    103037494 A    4/2013
CN    104471866 A    3/2015
(Continued)

OTHER PUBLICATIONS

Intel Corporation, "Scheduling request design for NR"; 3GPP TSG-RAN WG1 #86bis Lisbon, Portugal, Oct. 10-14, 2016 R1-1610191 (Year: 2016).*

(Continued)

*Primary Examiner* — Gary Mui
(74) *Attorney, Agent, or Firm* — Womble Bond Dickinson (US) LLP (57) ABSTRACT

This application provides a scheduling request transmission method and an apparatus. The method includes: configuring, by a network device for a terminal device, a scheduling request (SR) resource carried on an uplink control channel; configuring, by the network device, a mapping relationship between the SR resource and a plurality of available uplink beam pairs for the terminal device; and receiving, by the network device, a scheduling request sent by the terminal device by using the plurality of uplink beam pairs and the corresponding SR resource. According to the scheduling request transmission method and the apparatus that are provided in this application, an SR is sent in a multi-beam communication scenario.

13 Claims, 5 Drawing Sheets

(51) Int. Cl.
*H04W 68/00* (2009.01)
*H04W 72/04* (2009.01)

(58) Field of Classification Search
CPC .......... H04W 72/046; H04W 72/1268; H04W 74/0833; H04W 74/36
See application file for complete search history.

(56) References Cited

U.S. PATENT DOCUMENTS

2017/0142708 A1* 5/2017 Ho .................... H04W 72/042
2018/0110066 A1* 4/2018 Luo ................... H04W 72/0413
2018/0309496 A1* 10/2018 Lee ................... H04L 5/0053
2018/0324820 A1* 11/2018 Ye .................... H04W 72/10
2019/0082333 A1* 3/2019 Malik ................. H04W 24/10
2019/0082438 A1* 3/2019 John Wilson ....... H04W 72/042
2020/0036430 A1* 1/2020 Kim ................... H04W 24/10

FOREIGN PATENT DOCUMENTS

CN    105356981 A    2/2016
WO    2017014572 A1  1/2017

OTHER PUBLICATIONS

Intel Corporation: "Scheduling request design for NR",3GPP Draft; R1-1702234,Feb. 7, 2017,total 6 pages.
Qualcomm Incorporated,"Beam Recovery Procedures",3GPP TSG-RAN WG1 #88 R1-1702606,Feb. 13-17, 2017,total 8 pages.
Huawei et al:"RACH preamble design for NR",3GPP Draft; R1-1701709,Feb. 12, 2017,total 16 pages.

* cited by examiner

SCHEDULING REQUEST TRANSMISSION METHOD AND APPARATUS

CROSS-REFERENCE TO RELATED APPLICATIONS

This application is a continuation of International Application No. PCT/CN2018/080402, filed on Mar. 24, 2018 which claims priority to Chinese Patent Application No. 201710214559.8, filed on Apr. 1, 2017, the disclosures of the aforementioned applications being hereby incorporated by reference in their entireties.

TECHNICAL FIELD

This application relates to the field of communications technologies, and in particular, to a scheduling request transmission method and an apparatus.

BACKGROUND

Figure 1:
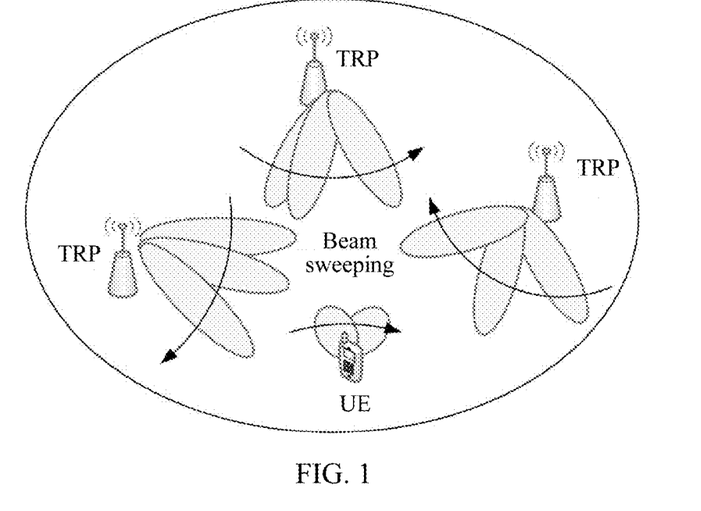
FIG. 1 is a schematic diagram of a network architecture of an application scenario according to an embodiment of the present application.

In a 5G communications system, a carrier frequency, such as 38 GHz or 72 GHz, higher than that in Long Term Evolution (LTE) is used, to implement wireless communication with larger bandwidth and a higher transmission rate. Due to the higher carrier frequency, a radio signal transmitted in the 5G communications system goes through severer fading in a spatial propagation process, and even it is difficult to detect the radio signal at a receive end. Therefore, a beamforming technology is used in the 5G communications system to obtain a beam having good directivity. As shown in FIG. 1, a terminal device communicates with a network device by using a beam pair, to increase a power in a transmit direction, thereby increasing a signal to interference plus noise ratio (SINR) at the receive end.

To further improve communication quality, analog beams in different direction are also generated by using the beamforming technology at a terminal device side, to send and receive data. A base station and user equipment communicate with each other by using relatively narrow analog beams. Therefore, better communication quantity is obtained only when analog beam pairs used for sending and receiving are aligned. Therefore, in the 3GPP, it is determined that in 5G NR (New Radio), a beam sweeping process is used to determine a beam pair between a base station and a terminal device, and monitor a plurality of beam pairs during communication, to improve robustness of a communications link.

In the 3GPP RAN 1 meeting, it has been already discussed and agreed that a terminal device is adapted to monitor, on a same OFDM (orthogonal frequency division multiplexing) symbol or on different OFDM symbols, a downlink control channel, such as an NR-PDCCH (NR-physical downlink control channel), on a plurality of beam pairs (also referred to as a beam pair link (BPL)), to improve robustness of a downlink.

In an LTE (long term evolution) system, a base station may configure a periodic uplink resource for a terminal device in connected (RRC_CONNECTED) mode, to send a scheduling request (SR) to the terminal device. When the terminal device has no sufficient uplink resource for sending data, the terminal device initiates a scheduling request to a base station on an SR resource. However, in 5G NR, reliable communication can be performed only when a beam of a network device and a beam of a terminal device are aligned. How to transmit an SR in a multi-beam communication scenario is a current problem that needs to be resolved.

SUMMARY

This application provides a scheduling request transmission method to transmit an SR in a multi-beam communication scenario.

According to one aspect, a scheduling request transmission method is disclosed. The method includes: configuring, by a network device for a terminal device, an SR resource carried on an uplink control channel; configuring, by the network device, a mapping relationship between the SR resource and a plurality of available uplink beam pairs for the terminal device; and receiving, by the network device, a scheduling request sent by the terminal device by using the plurality of uplink beam pairs and the corresponding SR resource.

Corresponding to the terminal device according to the first aspect, a scheduling request transmission method is further disclosed. The method includes: obtaining, by a terminal device, an SR resource that is carried on an uplink control channel and that is configured by a network device for the terminal device; obtaining, by the terminal device, a mapping relationship that is between the SR resource and a plurality of available uplink beam pairs and that is configured by the network device for the terminal device; and sending, by the terminal device, an SR by using the plurality of uplink beam pairs and the corresponding SR resource.

With reference to the foregoing aspects, the SR resource is used for the scheduling request. The sending an SR by using the corresponding SR resource is sending the SR on the corresponding SR resource. Due to the mapping relationship between the SR resource and the available uplink beam pairs, the terminal device sends the SR based on the mapping relationship on the corresponding SR resource by using the plurality of uplink beam pairs.

With reference to the foregoing aspects, before the configuring a mapping relationship, the method further includes: separately determining, by the network device and/or the terminal device, the plurality of available uplink beam pairs; and if the network device and/or the terminal device has already learned of the plurality of available uplink beam pairs, this operation is not required and there may be one available uplink beam pair sometimes.

With reference to the foregoing aspects, configuring, by the network device for the terminal device, the SR resource carried on the uplink control channel includes: allocating, by the network device, a plurality of SR resources carried on the uplink control channel to the terminal device, and notifying the terminal device of the plurality of allocated SR resources by using RRC signaling or in another manner. The uplink control channel may be a PUCCH (physical uplink control channel), for example, an NR-PUCCH in 5G.

With reference to the foregoing aspects, there are usually a plurality of SR resources, configuring, by the network device, the mapping relationship between the plurality of SR resources and the plurality of available uplink beam pairs for the terminal device includes: mapping the plurality of SR resources to the plurality of uplink beam pairs, and notifying the terminal device of the mapping relationship between the plurality of SR resources and the plurality of uplink beam pairs by using RRC (radio resource control) signaling, an MAC CE (Media Access Control control element), or DCI (downlink control information), or in another manner. The foregoing mapping relationship is usually that one SR resource corresponds to one uplink beam pair. If a quantity of the SR resources is greater than a quantity of the available uplink beam pairs, only some of the SR resources may be mapped to the available uplink beam pairs; or if a quantity of the SR resources is less than a quantity of the available uplink beam pairs, only some of the uplink beam pairs may be used; or a manner in which one SR resource corresponds to the plurality of uplink beam pairs may alternatively be used for mapping some SR resources.

In another example, if only one SR resource is configured, the SR resource may be mapped to the plurality of beam pairs, and the terminal device is notified of the mapping relationship between the SR resource and the plurality of uplink beam pairs by using RRC signaling, an MAC CE, or DCI, or in another manner.

With reference to the foregoing aspects, the available uplink beam pairs are usually beam pairs used for uplink transmission. For example, there are usually a plurality of beam pairs for uplink data transmission, or there may be one beam pair for uplink data transmission. One beam pair includes one transmit beam and one receive beam. The terminal device sends the SR on the corresponding SR resource by using transmit beams of the plurality of uplink beam pairs, and the network device receives, by using receive beams of the plurality of uplink beam pairs, the SR sent by the terminal device.

With reference to the foregoing aspects, when a quantity of retransmission times of each of a plurality of SRs exceeds a maximum quantity of retransmission times, the terminal device releases all the SR resources. Further, the terminal device may initiate random access on an available beam pair.

In addition, when the plurality of SR resources are mapped one-to-one to the plurality of uplink beam pairs, the network device may configure an SR prohibit timer for each SR resource to prohibit continuously sending the SR by using a same uplink beam pair. The configured SR prohibit timer and the allocated SR resource may be delivered together or may be separately delivered. Alternatively, the network device may configure an SR prohibit timer for each available uplink beam pair. The configured SR prohibit timer and the configured mapping relationship may be delivered together or may be separately delivered.

When one SR resource is mapped to the plurality of uplink beam pairs, the network device may configure an SR prohibit timer for each available uplink beam pair. The configured SR prohibit timer and the configured mapping relationship may be delivered together or separately delivered. Alternatively, after the terminal device receives the mapping relationship, the network device may configure, for the beam pairs, SR prohibit timers whose parameters are the same and that are independently used.

When the terminal device sends SRs, because each SR resource or each uplink beam pair corresponds to one SR prohibit timer, the SR prohibit timers corresponding to the SRs are started, and corresponding counters also start to work; and if the terminal device receives a response message, such as UL grant (uplink grant) information, sent by the network device for the SR, the terminal device stops the SR prohibit timers of all the SRs and resets the counters.

During running of the SR prohibit timer corresponding to each SR resource or each uplink beam pair, the terminal device is prohibited from resending the SR on the SR resource or by using the uplink beam pair. After the SR prohibit timer is stopped, the SR may be retransmitted. When a quantity of retransmission times of each of the plurality of SRs exceeds the maximum quantity of retransmission times, the terminal device may release uplink control channel resources corresponding to all the SRs and release pending states of all the SRs. Further, the terminal device may initiate random access on an available beam pair.

Corresponding to the network device according to the solution of the first aspect, a network device is further disclosed. The network device includes:

a configuration module, adapted to: configure, for a terminal device, an SR resource carried on an uplink control channel; and configure a mapping relationship between the SR resource and a plurality of available uplink beam pairs for the terminal device; and a receiving module, adapted to receive a scheduling request sent by the terminal device by using the plurality of uplink beam pairs and the corresponding SR resource.

With reference to the foregoing solution, the configuration module includes: a processing module, adapted to allocate the SR resource carried on the uplink control channel to the terminal device; and a sending module, adapted to notify the terminal device of the allocated SR resource, where the processing module is further adapted to map the SR resource to the plurality of uplink beam pairs; and the sending module is further adapted to notify the terminal device of the mapping relationship between the SR resource and the plurality of uplink beam pairs.

In addition, the foregoing network device may include only the sending module, the receiving module, and the processing module.

Corresponding to the terminal device according to the solution of the first aspect, a terminal device is further disclosed. The terminal device includes:

a receiving module, adapted to: obtain an SR resource that is configured by a network device for the terminal device and that is carried on an uplink control channel, and obtain a mapping relationship between the SR resource configured by the network device for the terminal device and a plurality of uplink beam pairs; and a sending module, adapted to send an SR by using the plurality of uplink beam pairs and the corresponding SR resource.

The terminal device may further include a processing module, adapted to perform operations other than a sending/receiving operation in the method.

The network device and the terminal device completely correspond to the network device and terminal device in the method according to the first aspect, and a corresponding operation is performed by a corresponding module. For other functions, refer to the descriptions in the method, and details are not described herein again.

According to another aspect, a scheduling request transmission method is disclosed. The method includes:

obtaining, by a terminal device, a dedicated SR resource configured by a network device for the terminal device; associating the dedicated SR resource with a plurality of available uplink beam pairs; and sending, by the terminal device, an SR by using the plurality of uplink beam pairs and the corresponding dedicated SR resource Corresponding to the network device according to the other aspect, a scheduling request transmission method is further disclosed. The method includes:

allocating, by a network device, a dedicated SR resource to the terminal device, so that the terminal device associates the dedicated SR resource with a plurality of available uplink beam pairs; and receiving, by the network device, an SR sent by the terminal device by using the plurality of uplink beam pairs and the corresponding dedicated SR resource With reference to the foregoing aspects, the SR resource is used for the scheduling request. The sending an SR by using the corresponding SR resource is sending the SR on the corresponding SR resource. Due to the association relationship between the SR resource and the available uplink beam pairs, the terminal device sends the SR based on the association relationship on the corresponding SR resource by using the plurality of uplink beam pairs.

With reference to the foregoing aspects, the method further includes: responding, by the network device, to the SR on symbols of downlink control channels whose quantity is the same as a quantity of dedicated SR resources.

With reference to the foregoing aspects, the dedicated SR resource is an SR domain or a resource in a channel associated with a synchronization beam. For example, the SR domain is a resource that is located in a same time slot as a random access channel and is shared by the random access channel in a frequency division multiplexing manner.

With reference to the foregoing aspects, before the associating the dedicated SR resource with a plurality of available uplink beam pairs further includes: determining, by the terminal device, the plurality of available uplink beam pairs; and if the terminal device has already learned of the plurality of available uplink beam pairs, this operation is not required.

With reference to the foregoing aspects, configuring, by the network device, the dedicated SR resource for the terminal device includes: allocating, by the network device, the dedicated SR resource to the terminal device, and notifying the terminal device of the allocated dedicated SR resource by using RRC signaling or DCI, or in another manner.

With reference to the foregoing aspects, there may be one or more dedicated SR resources, and the associating the dedicated SR resource with a plurality of uplink beam pairs includes: associating the dedicated SR resource with the plurality of uplink beam pairs, or associating the plurality of dedicated SR resources with the plurality of uplink beam pairs, where one dedicated SR resource corresponds to one uplink beam pair. If a quantity of the dedicated SR resources is greater than a quantity of the available uplink beam pairs, only some of the SR resources may be associated with the available uplink beam pairs; or if a quantity of the SR resources is less than a quantity of the available uplink beam pairs, only some of the uplink beam pairs may be used; or a manner in which one SR resource corresponds to the plurality of uplink beam pairs may alternatively be used for associating some SR resources.

With reference to the foregoing aspects, the available uplink beam pairs are usually beam pairs used for uplink transmission. For example, there are usually a plurality of beam pairs for uplink data transmission, or there may be one beam pair for uplink data transmission sometimes. One beam pair includes one transmit beam and one receive beam. The terminal device sends the SR on the corresponding dedicated SR resource by using transmit beams of the plurality of uplink beam pairs, and the network device receives, by using synchronization beams corresponding to receive beams of the plurality of uplink beam pairs, the SR sent by the terminal device.

With reference to the foregoing aspects, when a quantity of retransmission times of each of a plurality of SRs exceeds a maximum quantity of retransmission times, the terminal device releases all the dedicated SR resources. Further, the terminal device may initiate random access, for example, on an available beam pair.

In addition, when the plurality of dedicated SR resources are mapped one-to-one to the plurality of uplink beam pairs, in one embodiment, one dedicated SR resource is associated with one uplink beam pair, the network device may configure an SR prohibit timer for each SR resource to prohibit continuously sending the SR by using a same uplink beam pair, and the configured SR prohibit timer may be delivered together with the allocated dedicated SR resource.

When one dedicated SR resource is associated with the plurality of uplink beam pairs, the network device may configure an SR prohibit timer for the dedicated SR resource. The configured SR prohibit timer and the allocated dedicated SR resource may be delivered together or may be separately delivered. Alternatively, after the terminal device receives the association relationship, when the terminal device associates the dedicated SR resource with the plurality of beam pairs, the terminal device may configure, for the beam pairs, independent SR prohibit timers whose parameters are the same.

When the terminal device sends SRs, because each dedicated SR resource or each uplink beam pair corresponds to one SR prohibit timer, the SR prohibit timers corresponding to the SRs are started, and corresponding counters also start to work; and if the terminal device receives a response message, such as UL grant information, sent by the network device for the SR, the terminal device stops the SR prohibit timers of all the SRs and resets the counters.

During running of the SR prohibit timer corresponding to each SR resource or each uplink beam pair, the terminal device is prohibited from resending the SR on the SR resource or by using the uplink beam pair. After the SR prohibit timer is stopped, the SR may be retransmitted. When a quantity of retransmission times of each of the plurality of SRs exceeds the maximum quantity of retransmission times, the terminal device may release uplink control channel resources corresponding to all the SRs and release pending states of all the SRs. Further, the terminal device may initiate random access on an available beam pair.

Corresponding to the solution according to the other aspect, a terminal device is further disclosed. The terminal device includes:

a receiving module, adapted to obtain a dedicated SR resource allocated by a network device to the terminal device; a processing module, adapted to associate the dedicated SR resource with a plurality of available uplink beam pairs; and a sending module, adapted to send an SR on the corresponding dedicated SR resource by using the plurality of uplink beam pairs.

Corresponding to the solution according to the other aspect, a network device is further disclosed. The network device includes:

a configuration module, adapted to configure a dedicated SR resource for a terminal device, so that the terminal device associates the dedicated SR resource with a plurality of available uplink beam pairs; and a receiving module, adapted to receive an SR sent by the terminal device on the corresponding dedicated SR resource by using the plurality of uplink beam pairs.

With reference to the foregoing solution, the configuration module includes:

a processing module, adapted to allocate the dedicated SR resource to the terminal device; and a sending module, adapted to notify the terminal device of the dedicated SR resource allocated to the terminal device.

In addition, the network device may include only the sending module, the receiving module, and the processing module.

The network device and the terminal device completely correspond to the network device and the terminal device in the method according to the other aspect, and a corresponding operation is performed by a corresponding module. For other functions, refer to the descriptions in the method, and details are not described herein again.

According to another aspect, a scheduling request transmission method is provided. The method includes:

obtaining, by a terminal device, a dedicated SR resource configured by a network device for the terminal device; and sending an SR by using the dedicated SR resource and transmit beams whose quantity does not exceed a maximum quantity of beams.

Correspondingly, the network device configures the dedicated SR resource for the terminal device, and receives the SR sent by the terminal device by using the dedicated SR resource and the transmit beams whose quantity does not exceed the maximum quantity of beams.

The configuring, by the network device, the dedicated SR resource for the terminal device includes: allocating, by the network device, the dedicated SR resource to the terminal device, and notify the terminal device of the allocated dedicated SR resource by using RRC signaling or in another manner.

With reference to the foregoing aspect, before the sending an SR, the method further includes: obtaining, by the terminal device, the maximum quantity of beams for sending the SR, where the maximum quantity of beams may be stipulated in a standard, or may be notified by the network device to the terminal device.

Further, the network device may receive, on the dedicated SR resource by using a synchronization beam, the scheduling request sent by the terminal device.

The foregoing solution is similar to the solution according to the other aspect, there is usually one dedicated SR resource, and a difference between the foregoing solution and the other aspect lies in that the terminal device does not need to perform an association operation. For another operation, such as configuring an SR prohibit timer, refer to the solution according to the other aspect.

Compared with the solution according to the other aspect, in this solution, the terminal device does not need to establish an association relationship between the dedicated SR resource and an available beam pair, so that this solution is easier and more flexible. Other aspects in this solution are similar to those in the other aspect, and for other aspects, refer to the descriptions of the solution according to the other aspect.

Corresponding to the terminal device in the solution according to the other aspect, a terminal device is further disclosed. The terminal device includes:

a receiving module, adapted to obtain a dedicated SR resource configured by a network device for the terminal device; and a sending module, adapted to send an SR by using the dedicated SR resource and transmit beams whose quantity does not exceed a maximum quantity of beams.

The terminal device further includes a processing module, adapted to perform operations other than the sending operation and the receiving operation.

Corresponding to the network device in the solution according to the other aspect, a network device is further disclosed. The network device includes:

a configuration module, adapted to configure a dedicated SR resource for a terminal device; and a receiving module, adapted to receive an SR sent by the terminal device by using the dedicated SR resource and transmit beams whose quantity does not exceed a maximum quantity of beams.

The configuration module includes: a processing module, adapted to allocate the dedicated SR resource to the terminal device; and a sending module, adapted to notify the terminal device of the allocated SR resource by using RRC signaling or in another manner.

In addition, the network device may include only the sending module, the receiving module, and the processing module.

The network device and the terminal device completely correspond to the network device and the terminal device in the method according to the other aspect, and a corresponding operation is performed by a corresponding module. For other functions, refer to the descriptions in the method, and details are not described herein again.

Still another aspect of this application provides a computer program product including an instruction. When the computer program product is run on a computer, the computer is enabled to perform the method according to the foregoing aspects.

Still another aspect of this application provides a computer-readable storage medium. The computer-readable storage medium stores an instruction. When the instruction is run on a computer, the computer is enabled to perform the method according to the foregoing aspects.

According to the scheduling request transmission method and the apparatus that are provided in this application, an SR is transmitted in a multi-beam communication scenario.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

A terminal device in the embodiments of this application may be an access terminal, a subscriber unit, a subscriber station, a mobile station, a mobile console, a remote station, a remote terminal, a mobile device, a user terminal, a terminal, a wireless communications device, a user agent, or a user apparatus. An access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal in a 5G network, or the like.

A network device in the embodiments of this application is a network side device wirelessly communicating with the terminal device, for example, a wireless fidelity (Wi-Fi) access point, a base station for next-generation communication, such as a gNB or a small cell, a micro cell, or a TRP (transmission reception point) in 5G; or may be a relay station, an access point, an in-vehicle device, a wearable device, or the like.

Figure 2:
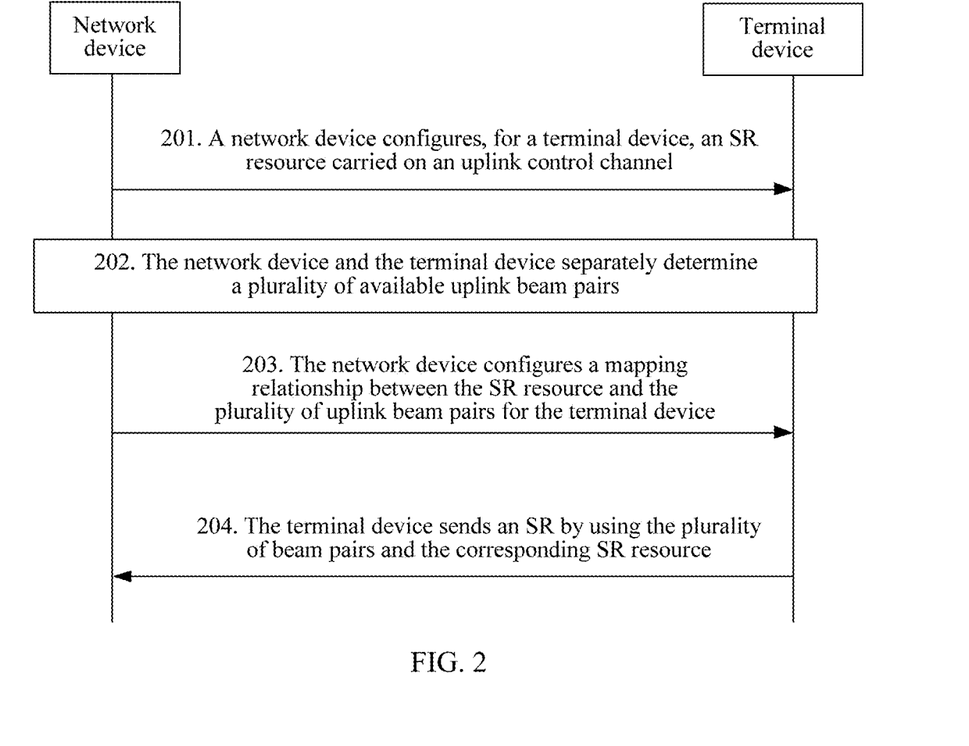
FIG. 2 is a flowchart of a scheduling request transmission method according to an embodiment of this application.

In an embodiment, the network device allocates, to the terminal device, an SR resource carried on an uplink control channel (such as an NR-PUCCH), for the terminal device to send an SR, and establishes an association relationship with an available uplink beam pair. Referring to FIG. 2, the method includes the following operations.

201: The network device configures, for the terminal device, an SR resource carried on an uplink control channel.

After the terminal device is successfully connected to a network, the network device, such as a base station, may allocate the SR resource carried on the uplink control channel to the terminal device, and notify the terminal device of the SR resource. For example, the uplink control channel is an NR-PUCCH, and the terminal device may be notified of the SR resource by using RRC signaling or DCI, or in another manner. A quantity of SR resources may be determined by the network device. There are usually a plurality of SR resources, or there may be one SR resource. For example, the quantity of SR resources may be determined with reference to a factor such as a capability of the terminal device or cell scheduling. Similar to LTE, a related parameter of each SR resource includes at least one parameter of a resource location of the SR resource on the NR-PUCCH, an SR sending period, a maximum quantity of SR retransmission times, or a sequence number of the SR resource.

A plurality of SR resources may be an SR set. In one embodiment, the network device configures an SR set for the terminal device, and the SR set includes a plurality of SR resources.

In addition, the network device may configure an SR prohibit timer for each SR resource, and notify the terminal device of the configured SR prohibit timer. The terminal device may be notified of the configured SR prohibit timer and the allocated SR resource together by using an RRC message.

202: The network device and the terminal device separately determine a plurality of available uplink beam pairs.

This operation is optional, if the network device and/or the terminal device has already learned of the available uplink beam pairs, this operation does not need to be performed.

The network device may manage beams by scheduling the terminal device, to determine the uplink beam pairs that can be used for uplink transmission. The uplink beam pairs are usually a plurality of beam pairs that can be used for uplink data transmission. Certainly, there may be one uplink beam pair sometimes. One uplink beam pair includes a transmit beam and a receive beam.

The network device may notify the terminal device of information about the plurality of determined uplink beam pairs. Alternatively, the terminal device may determine the available uplink beam pairs. For example, when uplink and downlink beam pairs are consistent, the terminal device may have already observed a plurality of available downlink beam pairs, and notified the network device of the plurality of available downlink beam pairs, so that the available uplink beam pairs are determined.

A quantity of the available beam pairs is usually determined by the network device, and is related to the factor such as the capability of the terminal device or the cell scheduling.

203: The network device configures a mapping relationship between the SR resource and the plurality of uplink beam pairs for the terminal device.

If there is one SR resource, the SR resource may be mapped to one uplink beam pair or the plurality of uplink beam pairs; or if there are a plurality of SR resources, the plurality of SR resources may be mapped to the plurality of uplink beam pairs, and each uplink beam pair corresponds to one SR resource; or if the quantity of allocated SR resources is greater than the quantity of the beam pairs, only some of the SR resources may be mapped to the beam pairs.

The network device may configure the mapping relationship between the SR resource and the plurality of uplink beam pairs, and notify the terminal device of the mapping relationship, for example, by using a MAC CE, RRC, or DCI. The mapping relationship may be a mapping relationship between identifiers of the uplink beam pairs and the SR resource, or may be a mapping relationship between identifiers of transmit beams or receive beams of the uplink beam pairs and the SR resource.

In addition, the network device may configure an SR prohibit timer for each uplink beam pair, and notify the terminal device of the configured SR prohibit timer. The terminal device may be notified of the configured SR prohibit timer and the mapping relationship together, or may be separately notified of the configured SR prohibit timer and the mapping relationship. Alternatively, after the terminal device receives the mapping relationship, the network device configures, for the beam pairs, SR prohibit timers whose parameters are the same and that are independently used.

204: The terminal device sends an SR by using the plurality of beam pairs and the corresponding SR resource.

The terminal device has already learned of the mapping relationship between the SR resource and the plurality of available uplink beam pairs, so that when needing to initiate the scheduling request, the terminal device may send, based on the mapping relationship, the SR on the corresponding SR resource by using the plurality of beam pairs. Certainly, the terminal device may alternatively send the SR by using only some of the plurality of beam pairs.

In one embodiment, the terminal device sends a plurality of SRs by using transmit beams of the plurality of uplink beam pairs, and the network device may receive, by using corresponding receive beams of the plurality of uplink beam pairs, the plurality of SRs that are sent by the terminal device.

Further, when the terminal device sends the SR, because each SR resource or uplink beam pair corresponds to one SR prohibit timer, the corresponding SR prohibit timers are started, and corresponding counters also start to work. For example, if one SR resource is mapped to one uplink beam pair, when the terminal device sends the SR by using the SR resource, an SR prohibit timer corresponding to the SR resource is started, and a corresponding counter also starts to work; or if one SR resource is mapped to the plurality of uplink beam pairs, when the terminal device sends the SR by using a particular uplink beam pair associated with the SR resource, an SR prohibit timer corresponding to the uplink beam pair is started, and a corresponding counter also starts to work.

During running of the SR prohibit timer corresponding to each SR resource or uplink beam pair, the terminal device is prohibited from resending the SR on the SR resource or by using the uplink beam pair. When a quantity of retransmission times of each of the plurality of SRs exceeds a maximum quantity of retransmission times, the terminal device needs to release NR-PUCCH resources corresponding to all the SRs, and release pending states of all the SRs. Further, the terminal device may initiate random access on an available beam pair.

If the terminal device receives a response message, such as UL grant information, sent by the network device for the SR, the terminal device stops the SR prohibit timers of all the SRs, and resets the counters.

In addition, the SR prohibit timer may alternatively correspond to each beam pair. In one embodiment, the network device configures an SR prohibit timer for each available beam pair, and notifies the terminal device of the configured SR prohibit timer. The configured SR prohibit timer may be notified to the terminal device together with the mapping relationship in operation 203, or the configured SR prohibit timer and the mapping relationship may be separately notified to the terminal device. After determining the plurality of available beam pairs, the network device may allocate an SR prohibit timer to each beam pair, and notify the terminal device of the allocated SR prohibit timer.

If there are a plurality of SR resources, the plurality of SR resources are respectively mapped to the plurality of beam pairs, and an SR prohibit timer may be set for the SR resource or the available beam pair; or if there is only one SR resource, the SR resource is mapped to the plurality of beam pairs, and an SR prohibit timer is usually set for the available beam pair.

In LTE, the network device may configure a dedicated uplink control channel resource for the terminal device to send a scheduling request (SR). However, such a mechanism cannot be directly applied to multi-beam based communication in NR. Assuming that in NR, an SR resource is allocated to the terminal device on a particular beam pair, the terminal device can send the SR only when the beam pair appears. When a quantity of beams maintained by the network device and a quantity of terminal devices served by the network device are relatively large, a relatively long SR period is caused. To shorten the SR sending period, in NR, a configuration of Y≥1 SR resources for the terminal device, and an association between the SR resources with Y beam pairs should be supported, and also the terminal device is allowed to send the SR by using the plurality of beam pairs.

Figure 3:
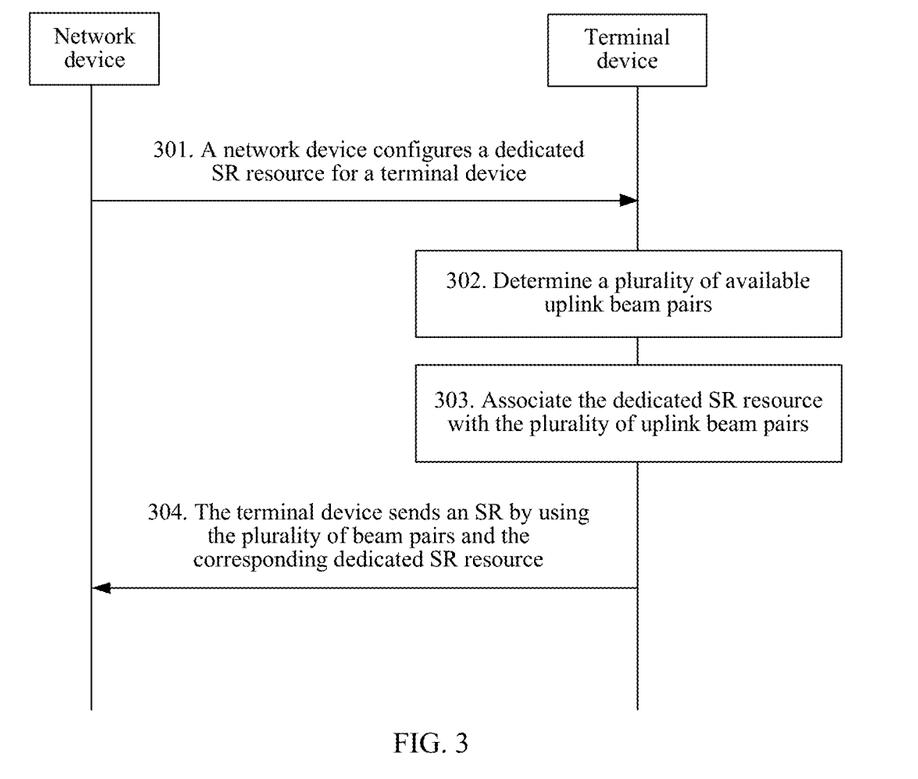
FIG. 3 is a flowchart of a scheduling request transmission method according to another embodiment of this application.

In another embodiment, the network device allocates a dedicated resource, for example, an SR domain or a resource in a channel associated with a synchronization beam, to the terminal device for a scheduling request; in one embodiment, the network device allocates a dedicated SR resource; in addition, the terminal device establishes an association relationship between the dedicated SR resource and an available uplink beam pair. Referring to FIG. 3, a process is as follows:

301: The network device configures a dedicated SR resource for the terminal device.

After the terminal device is successfully connected to a network, the network device, such as a base station, may allocate a plurality of dedicated SR resources to the terminal device, and notify the terminal device of the plurality of allocated dedicated SR resources by using RRC signaling or DCI, or in another manner. For example, related parameters of each SR resource include at least one of a sequence number, a preamble/sequence, a frequency domain resource location, and the like of the SR resource. A quantity of dedicated SR resources may be determined by the network device. There are usually a plurality of dedicated SR resources, or there may be one SR resource. For example, the quantity of dedicated SR resources may be determined with reference to a factor such as a capability of the terminal device or cell scheduling.

The plurality of dedicated SR resources may be an SR set. In one embodiment, the network device configures a dedicated SR set for the terminal device, and the dedicated SR set includes the plurality of dedicated SR resources.

In addition, the network device may configure an SR prohibit timer for each dedicated SR resource, and notify the terminal device of the configured SR prohibit timer. The terminal device may be notified of the configured SR prohibit timer and the allocated dedicated SR resource together by using an RRC message.

Before this operation, the terminal device may learn of time and frequency locations of the dedicated SR resources, for the terminal device to determine an occasion of sending an SR. For example, the terminal device may obtain the time and frequency locations of the dedicated SR resources and an association relationship between the SR resources and synchronization beams by receiving a system message or according to a stipulation of a protocol.

302: The terminal device determines a plurality of available uplink beam pairs.

This operation is optional, if the terminal device has already learned of the available uplink beam pairs, this operation does not need to be performed.

The network device may notify the terminal device of information about the plurality of determined uplink beam pairs, so that the terminal device learns of the available uplink beam pairs. Alternatively, the terminal device may determine the available uplink beam pairs. For example, when uplink and downlink beam pairs are consistent, the terminal device may have already observed a plurality of available downlink beam pairs, and notified the network device of the plurality of available downlink beam pairs, so that the available uplink beam pairs are determined.

The uplink beam pairs are usually a plurality of beam pairs that can be used for uplink data transmission. Certainly, there may be one uplink beam pair sometimes. One uplink beam pair includes a transmit beam and a receive beam.

303: The terminal device associates the dedicated SR resource with the plurality of uplink beam pairs.

If there are a plurality of dedicated SR resources, the plurality of dedicated SR resources may be associated with the plurality of uplink beam pairs, and each uplink beam pair corresponds to one SR resource; or if a quantity of the dedicated SR resources is greater than a quantity of the beam pairs, only some of the SR resources may be associated with the beam pairs. During association establishment, the dedicated SR resources may be associated with identifiers of the plurality of uplink beam pairs, or the dedicated SR resources may be associated with identifiers of transmit beams or receive beams of the plurality of uplink beam pairs.

If there is one dedicated SR resource, the SR resource may be mapped to the plurality of uplink beam pairs. In this case, the network device pre-configures a quantity of beams associated with the SR, and notifies the terminal device of the quantity of beams associated with the SR.

When one dedicated SR resource is associated with the plurality of uplink beam pairs, the network device may configure an SR prohibit timer for the dedicated SR resource, and may deliver the SR prohibit timer and the allocated dedicated SR resource together, or may separately deliver the SR prohibit timer and the allocated dedicated SR resource. Alternatively, after the terminal device receives the association relationship, when the terminal device associates the dedicated SR resource with the plurality of beam pairs, the terminal device configures, for the beam pairs, independent SR prohibit timers whose parameters are the same.

304: The terminal device sends an SR by using transmit beams of the plurality of uplink beam pairs and the corresponding dedicated SR resource.

When the terminal device needs to initiate the scheduling request, the terminal device sends the SR by using the transmit beams of the uplink beam pairs and the corresponding dedicated SR resource. Certainly, the terminal device may alternatively send the SR by using only some of the plurality of beam pairs. Further, the network device receives, by using synchronization beams corresponding to corresponding receive beams of the plurality of uplink beam pairs, the SR sent by the terminal device.

Further, when the terminal device sends the SR, because each dedicated SR resource or uplink beam pair corresponds to one SR prohibit timer, the corresponding SR prohibit timers are started, and corresponding counters also start to work. For example, if one dedicated SR resource is mapped to one uplink beam pair, when the terminal device sends the SR by using the SR resource, an SR prohibit timer corresponding to the SR resource is started, and a corresponding counter also starts to work; or if one SR resource is mapped to the plurality of uplink beam pairs, the terminal device sends the SR by using a particular uplink beam pair associated with the SR resource, an SR prohibit timer corresponding to the uplink beam pair is started, and a corresponding counter also starts to work.

During running of the SR prohibit timer corresponding to each SR resource or uplink beam pair, the terminal device is prohibited from resending the SR on the SR resource or by using the uplink beam pair. When a quantity of retransmission times of each of a plurality of SRs exceeds a maximum quantity of retransmission times, the terminal device needs to release dedicated resources corresponding to all the SRs, and release pending states of all the SRs. Further, the terminal device may initiate random access on an available beam pair.

If the terminal device receives a response message, such as UL grant information, sent by the network device for the SR, the terminal device stops the SR prohibit timers of all the SRs, and resets the counters.

In the foregoing solution, when the network device responds to the SR, the network device has already learned of information about the beam pairs available for the terminal device, thereby facilitating flexible beam management.

In addition, the SR prohibit timer may alternatively correspond to each beam pair. In one embodiment, the network device configures an SR prohibit timer for each available beam pair, and notifies the terminal device of the configured SR prohibit timer. The terminal device may be notified of the configured SR prohibit timer before operation 303. After determining the plurality of available beam pairs, the network device may allocate an SR prohibit timer to each beam pair, and notify the terminal device of the allocated SR prohibit timer.

If there are a plurality of dedicated SR resources, the plurality of dedicated SR resources are respectively mapped to the plurality of beam pairs, and an SR prohibit timer may be set for the SR resource or the available beam pair; or if there is only one SR resource, the SR resource is mapped to the plurality of beam pairs, and an SR prohibit timer is usually set for the available beam pair. The SR prohibit timer may be configured by the network device, or may be configured by the terminal device for each beam pair based on the SR prohibit timer delivered by the network device.

Therefore, when in NR, the scheduling request is sent by using another dedicated resource, such as an SR domain, if the terminal device configures Y≥1 SR resources associated with Y beam pairs, a beneficial effect is provided for allowing the terminal device to send the SR by using the plurality of beam pairs. For example, two SR resources are configured for the terminal device, and the two SR resources are respectively associated with two beam pairs. In a subframe of a particular SR domain, the terminal device sends an SR by using both the two beam pairs. However, due to beam blocking, the terminal device successfully sends the SR by using only one beam pair. Next, in a subsequent frame, the network device sends uplink scheduling (UL grant) information on two PDCCH symbols by using the beam pair by using which the SR is successfully sent. The terminal device receives the PDCCH by scanning the two beam pairs within a period of time. Therefore, the terminal device can still receive the information. In a same scenario, if only one SR resource is configured, the terminal device may miss the information. In this case, the network device sends the information on only one PDCCH symbol, and the terminal device also cannot determine to a beam used to receive the PDCCH. Therefore, compared with a manner of configuring only one SR resource, if a manner of configuring a plurality of SR resources (where only resource sequence numbers of the plurality of SR resources are different, and no actual resource overheads are increased) is used. After the SR is sent by using the plurality of beam pairs, the network device can still flexibly send a request. However, in the manner of configuring one SR resource, a fixed location at which the network device sends the request needs to be learned of.

Figure 4:
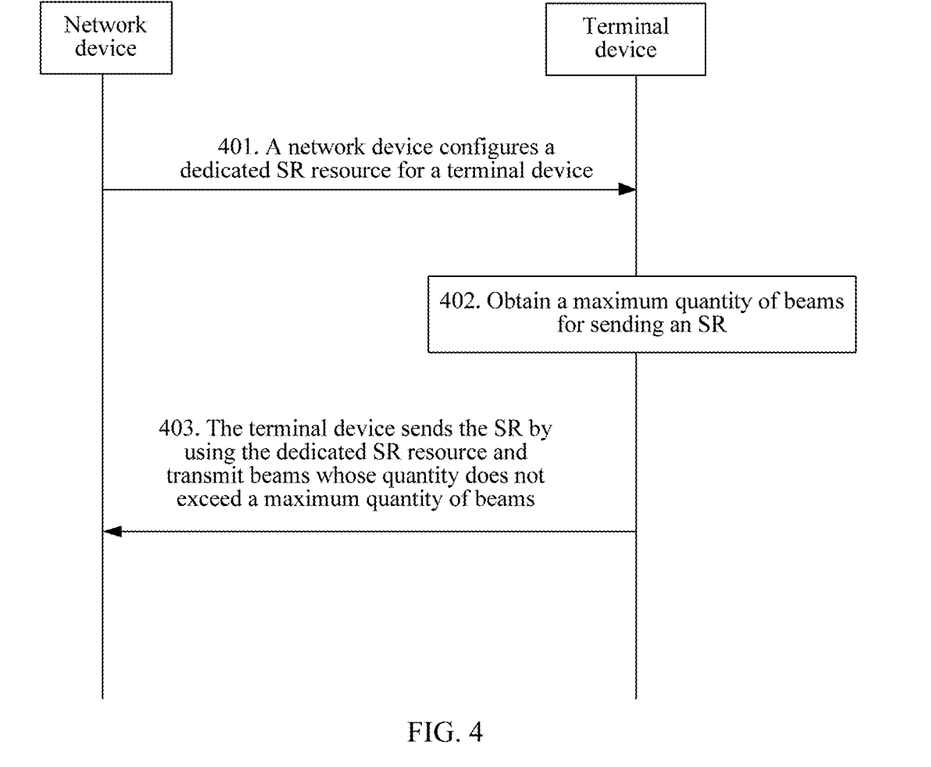
FIG. 4 is a flowchart of a scheduling request transmission method according to still another embodiment of this application.

In still another embodiment, the network device allocates the dedicated SR resource to the terminal device, and the terminal device obtains a maximum quantity of beams that can be used to send the SR, and then sends the SR by using transmit beams whose quantity does not exceed the quantity. Compared with the foregoing embodiment in FIG. 3, no association relationship needs to be established between the dedicated SR resource and the available beam pair, so that the still another embodiment is easier and more flexible.

Referring to FIG. 4, the method includes the following operations.

401: The network device configures a dedicated SR resource for the terminal device.

There is one dedicated SR resource herein. Further, an SR prohibit timer may be configured for the SR resource, and the dedicated SR resource and the SR prohibit timer are notified to the terminal device. This process is similar to operation 301. For other descriptions, refer to operation 301, and details are not described herein again.

402: The terminal device obtains a maximum quantity of beams for sending an SR.

This operation is optional. The maximum quantity of beams for sending the SR by the terminal device may be defined in a standard, so that the terminal device has already learned of the maximum quantity of beams for sending the SR. For example, it is stipulated in a protocol that the maximum quantity of beams for sending the SR is 2, 4, or 6. In addition, the network device may alternatively notify the terminal device of the maximum quantity of beams for sending the SR, so that the terminal device learns of the maximum quantity of beams for sending the SR. The network device may notify, by using RRC signaling, a MAC CE, or DCI signaling, or in another notification manner, the terminal device of the maximum quantity of beams for sending the SR, to indicate, to the terminal device, a quantity of transmit beams for sending the scheduling request within a period of time.

The period of time may be a PRACH (physical random access channel) subframe, a preset time window, or duration of the SR prohibit timer. The period of time is usually not longer than the duration of the SR prohibit timer. In addition, the period of time may alternatively be stipulated in a protocol. For example, in the protocol, it is stipulated that the period of time is duration in milliseconds, or it is stipulated that the period of time is the duration of the SR prohibit timer.

403: The terminal device sends the SR by using the allocated dedicated SR resource and the transmit beams whose quantity does not exceed the maximum quantity of beams.

The terminal device may send, within the period of time, the scheduling request by using the transmit beams whose quantity is less than or equal to the maximum quantity of beams and the corresponding dedicated SR resource.

After the terminal device sends the scheduling request, the SR prohibit timer and a corresponding counter are started. Within the period of time, the SR cannot be resent by using a same transmit beam, and the SR may be sent by using different transmit beams. In one embodiment, sending the SR by using different transmit beams is not limited by the SR prohibit timer. However, during running of the SR prohibit timer, the scheduling request cannot be resent by using a same beam. "1" may be added to the counter only each time the SR prohibit timer is started/restarted or each time a scheduling request is sent. This is related to a stipulation in the protocol.

When a quantity of retransmission times of the SR exceeds a maximum quantity of retransmission times, the terminal device needs to release dedicated resources of all SRs, and release pending states of all the SRs. Further, the terminal device may initiate random access on the available beam pair.

If the terminal device receives a response message, such as UL grant information, sent by the network device for the SR, the terminal device stops the SR prohibit timers of all the SRs, and resets the counters.

Correspondingly, the network device may receive, on the dedicated SR resource by using a synchronization beam, the scheduling request sent by the terminal device.

This embodiment is similar to the foregoing embodiment in FIG. 3, and a main difference lies in that the terminal device does not need to associate the dedicated SR resource with the available beam pair, so that this embodiment is easier and more flexible, the allocation of the dedicated SR resource, the setting of the SR prohibit timer, and sending and receiving of the SR are similar to those in the foregoing embodiment. For the allocation of the dedicated SR resource, the setting of the SR prohibit timer, and sending and receiving of the SR, refer to the descriptions of the corresponding operations in the embodiment in FIG. 3.

In a next embodiment, the network device allocates, to the terminal device, an SR resource carried on an uplink control channel (such as an NR-PUCCH) and a dedicated SR resource, for the terminal device to send an SR, and establishes an association relationship with an available uplink beam pair. This embodiment is a combination of the foregoing two embodiments. The method includes the following operations.

501: The network device configures, for the terminal device, an SR resource carried on an uplink control channel and a dedicated SR resource.

For the configuring, by the network device for the terminal device, the SR resource carried on the uplink control channel, refer to operation 201, and for the configuring, by the network device, the dedicated SR resource for the terminal device, refer to operation 301. The network device may allocate the foregoing two types of SR resources to the terminal device, and notify the terminal device of the allocated two types of SR resources by using RRC signaling or DCI, or in another manner.

In addition, the network device may configure an SR prohibit timer for each SR resource, and notify the terminal device of the configured SR prohibit timer. The terminal device may be notified of the configured SR prohibit timer and the allocated SR resource together by using an RRC message.

502: The network device and the terminal device separately determine a plurality of available uplink beam pairs.

For this operation, refer to operation 202, and details are not described herein again.

503: The network device configures a mapping relationship between the SR resource carried on the uplink control channel and the plurality of uplink beam pairs, and notifies the terminal device of the mapping relationship. For this operation, refer to operation 203, and details are not described herein again.

504: The terminal device associates the dedicated SR resource with the plurality of uplink beam pairs.

For this operation, refer to operation 303, and details are not described herein again.

505: The terminal device sends an SR on the corresponding SR resource by using the plurality of uplink beam pairs.

For this operation, refer to operation 204 and operation 304.

The network device receives, by using receive beams of the plurality of uplink beam pairs, the SR carried on the SR resource carried on the uplink control channel, and the network device receives, by using synchronization beams corresponding to the receive beams of the plurality of uplink beam pairs, the SR carried on the dedicated SR resource.

The foregoing method embodiment may be considered as a combination of the foregoing two method embodiments. For details, refer to the descriptions of the foregoing two method embodiments.

Figure 5:
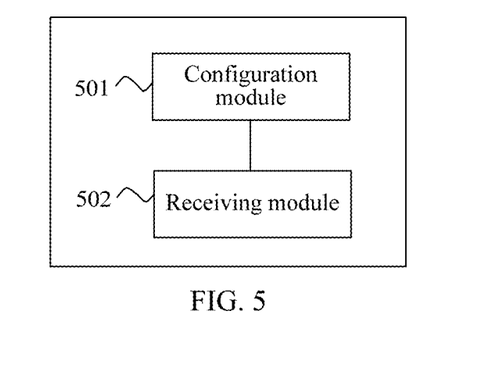
FIG. 5 is a schematic diagram of a network device according to an embodiment of this application.

Corresponding to the network device in the method embodiment in FIG. 2, a network device is further disclosed. Referring to FIG. 5, the network device includes:

a configuration module 501, adapted to: configure, for a terminal device, an SR resource that is used for a scheduling request and that is carried on an uplink control channel; and configure a mapping relationship between the SR resource and a plurality of available uplink beam pairs for the terminal device; and a receiving module 502, adapted to receive a scheduling request sent by the terminal device by using the plurality of uplink beam pairs and the corresponding SR resource.

The configuration module includes:

a processing module, adapted to allocate the SR resource that is used for the scheduling request and that is carried on the uplink control channel to the terminal device; and a sending module, adapted to notify the terminal device of the allocated SR resource, where the processing module is further adapted to map the SR resource to the plurality of uplink beam pairs; and the sending module is further adapted to notify the terminal device of the mapping relationship between the SR resource and the plurality of uplink beam pairs.

In addition, the network device may include only the sending module, the receiving module, and the processing module.

The network device completely corresponds to the network device in the method embodiment, and a corresponding operation is performed by a corresponding module. For example, the sending module performs the sending operation or the notification operation in the method embodiment, the receiving module performs the receiving operation in the method embodiment, and other operations such as SR resource allocation, SR prohibit timer allocation, available beam pair determining, and mapping may be implemented by the processing module. Only some functions are listed in the foregoing content. For other functions, refer to corresponding operations in the method embodiment and the descriptions of the Summary part.

Figure 6:
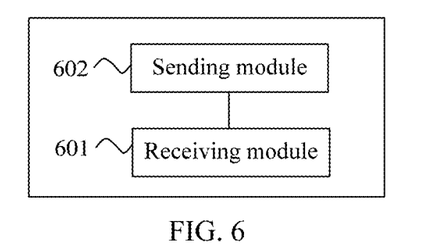
FIG. 6 is a schematic diagram of a terminal device according to an embodiment of this application.

Corresponding to the terminal device in the method embodiment in FIG. 2, a terminal device is further disclosed. Referring to FIG. 6, the terminal device includes:

a receiving module 601, adapted to: obtain an SR resource that is configured by a network device for the terminal device and that is carried on an uplink control channel; and obtain a mapping relationship between the SR resource configured by the network device for the terminal device and a plurality of uplink beam pairs; and a sending module 602, adapted to send an SR by using the plurality of uplink beam pairs and the corresponding SR resource.

The terminal device further includes a processing module (not shown), adapted to perform operations other than the sending operation and the receiving operation in the method embodiment.

The terminal device completely corresponds to the terminal device in the method embodiment, and a corresponding operation is performed by a corresponding module. For example, the sending module performs the sending operation or the notification operation in the method embodiment, the receiving module performs the receiving operation in the method embodiment, and other operations such as determining the quantity of beam pairs and starting the SR prohibit timer may be implemented by the processing module. Only some functions are listed in the foregoing content. For other functions, refer to corresponding operations in the method embodiment and the descriptions of the Summary part.

Figure 7:
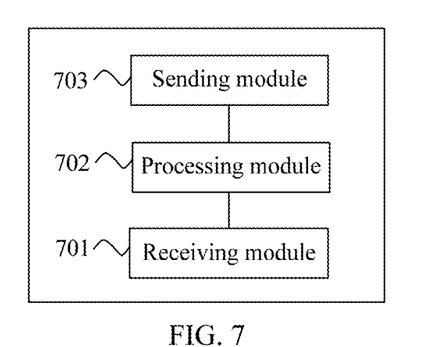
FIG. 7 is a schematic diagram of a terminal device according to another embodiment of this application.

Corresponding to the terminal device in the method embodiment in FIG. 3, a terminal device is further disclosed. Referring to FIG. 7, the terminal device includes:

a receiving module 701, adapted to obtain a dedicated SR resource allocated by a network device to the terminal device;

a processing module 702, adapted to associate the dedicated SR resource with a plurality of available uplink beam pairs; and a sending module 703, adapted to send a scheduling request on the corresponding dedicated SR resource by using the plurality of uplink beam pairs.

The terminal device completely corresponds to the terminal device in the method embodiment, and a corresponding operation is performed by a corresponding module. For example, the sending module performs the sending operation or the notification operation in the method embodiment, the receiving module performs the receiving operation in the method embodiment, and other operations such as determining the quantity of beam pairs and starting the SR prohibit timer may be implemented by the processing module. Only some functions are listed in the foregoing content. For other functions, refer to corresponding operations in the method embodiment and the descriptions of the Summary part.

Figure 8:
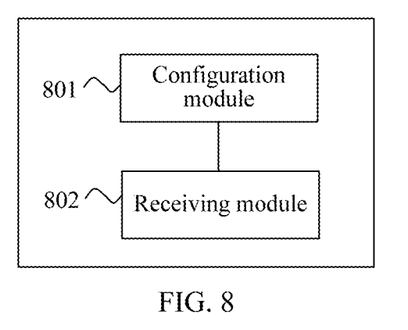
FIG. 8 is a schematic diagram of a network device according to another embodiment of this application.

Corresponding to the network device in the method embodiment in FIG. 3, a network device is further disclosed. Referring to FIG. 8, the network device includes:

a configuration module 801, adapted to configure a dedicated SR resource for a terminal device, so that the terminal device associates the dedicated SR resource with a plurality of available uplink beam pairs; and a receiving module 802, adapted to receive an SR sent by the terminal device on the corresponding dedicated SR resource by using the plurality of uplink beam pairs.

The configuration module includes:

a processing module, adapted to allocate the dedicated SR resource to the terminal device; and a sending module, adapted to notify the terminal device of the dedicated SR resource allocated to the terminal device.

In addition, the network device may include only the sending module, the receiving module, and the processing module.

The network device completely corresponds to the network device in the method embodiment, and a corresponding operation is performed by a corresponding module. For example, the sending module performs the sending operation or the notification operation in the method embodiment, the receiving module performs the receiving operation in the method embodiment, and other operations such as SR resource allocation and SR prohibit timer allocation may be implemented by the processing module. Only some functions are listed in the foregoing content. For other functions, refer to corresponding operations in the method embodiment and the descriptions of the Summary part.

Corresponding to the terminal device in the method embodiment in FIG. 4, a terminal device is further disclosed. Referring to FIG. 6, the terminal device includes:

a receiving module 601, adapted to obtain a dedicated SR resource configured by a network device for the terminal device; and a sending module 602, adapted to send an SR by using the dedicated SR resource and transmit beams whose quantity does not exceed a maximum quantity of beams.

The terminal device further includes a processing module (not shown), adapted to perform operations other than the sending operation and the receiving operation in the method embodiment.

Corresponding to the network device in the method embodiment in FIG. 4, a network device is further disclosed. Referring to FIG. 8, the network device includes:

a configuration module 801, adapted to configure a dedicated SR resource for a terminal device; and a receiving module 802, adapted to receive an SR sent by the terminal device by using the dedicated SR resource and transmit beams whose quantity does not exceed a maximum quantity of beams.

The configuration module includes: a processing module, adapted to allocate the dedicated SR resource to the terminal device; and a sending module, adapted to notify the terminal device of the allocated SR resource by using RRC signaling or in another manner.

In addition, the network device may include only the sending module, the receiving module, and the processing module.

The network device and the terminal device completely correspond to the network device and the terminal device in the method embodiment, and a corresponding operation is performed by a corresponding module. For example, the sending module performs the sending operation or the notification operation in the method embodiment, the receiving module performs the receiving operation in the method embodiment, and other operations such as SR resource allocation and SR prohibit timer allocation may be implemented by the processing module. Only some functions are listed in the foregoing content. For other functions, refer to corresponding operations in the method embodiment and the descriptions of the Summary part.

According to the foregoing method and the apparatus, the network device configures one or more SR resources for the terminal device, so that the terminal device can send a scheduling request by using a plurality of beam pairs according to the corresponding method, thereby facilitating reducing an SR sending period and reducing a time taken by the terminal device for waiting for a periodic SR resource. In addition, in NR, in a beam failure case, a beam resume request may further be initiated by using the SR resource. With reference to the method in this embodiment, the beam resume request is sent by using the plurality of beam pairs, so that a probability of successfully sending a beam resume request signal can be increased.

The foregoing embodiments are merely embodiments for scheduling request transmission. However, actually, for other content, such as an ACK/NACK, a CQI (channel quality indicator), a PMI (precoding matrix indication), carried on an uplink control channel, uplink transmission based on a plurality of beam pairs can be implemented by configuring a plurality of uplink control channel resources, thereby improving robustness of an uplink. One manner is similar to that in the foregoing embodiment, and details are not described herein again.

There is an embodiment in another form for the network device and the terminal device in the foregoing embodiments. The processing module may be replaced with a processor, the sending module may be replaced with a transmitter, and the receiving module may be replaced with a receiver. The transmitter, the receiver, and the processor separately perform the sending operation, the receiving operation, and the related processing operation in the method embodiment. The transmitter and the receiver may form a transceiver.

Figure 9:
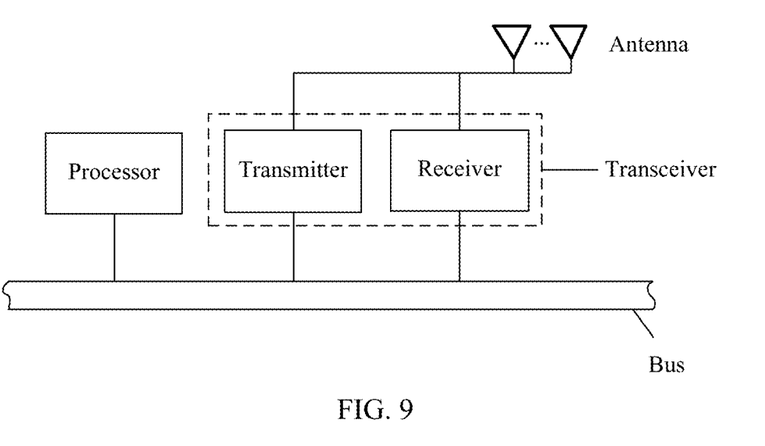
FIG. 9 is a schematic diagram of a network device/terminal device in another form according to an embodiment of this application.

For a structure of the apparatus embodiment in the other form, refer to FIG. 9. The processor may be a general-purpose processor, a digital signal processor, an application-specific integrated circuit, a field programmable gate array, or another programmable logic device.

The transmitter and the receiver may form a transceiver. An antenna may further be included. There may be one or more antennas.

The foregoing components may be coupled together by using a bus. The bus further includes a power supply bus, a control bus, and a status signal bus in addition to a data bus. However, for clear description, various types of buses in the figure are marked as the bus.

FIG. 9 is merely a schematic diagram, and the network device or the terminal device may further include other elements or may include only some elements, for example, include the transceiver and the receiver, or include only the transceiver, the receiver, and the processor.

Further, in one embodiment, the network device or the terminal device may further include a memory (not shown), adapted to store computer executable program code. When the program code includes an instruction, and the processor executes the instruction, the instruction causes the network device or the terminal device to perform a corresponding operation or step in the method embodiment. In addition, the memory may alternatively be in the processor.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the procedures or functions according to the embodiments of this application are generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

What is disclosed above is merely embodiments of this application, and certainly is not intended to limit the protection scope of this application. Therefore, equivalent variations made in accordance with the claims of this application shall fall within the scope of this application.

What is claimed is:

1. A scheduling request transmission method comprising:
configuring, by a network device for a terminal device, scheduling request (SR) resources carried on an uplink control channel;
when there are a plurality of SR resources, configuring, by the network device, a mapping relationship between the SR resources and a plurality of available uplink beam pairs for the terminal device by mapping the plurality of SR resources to the plurality of uplink beam pairs, and notifying the terminal device of the mapping relationship between the plurality of SR resources and the plurality of uplink beam pairs; and receiving, by the network device, a scheduling request sent by the terminal device by using the plurality of uplink beam pairs and a corresponding SR resource.

2. The method according to claim 1, wherein, when there is one SR resource, the configuring, by the network device, of a mapping relationship between the SR resource and a plurality of uplink beam pairs for the terminal device comprises:

mapping the SR resource to the plurality of uplink beam pairs, and notifying the terminal device of a mapping relationship between the SR resource and the plurality of uplink beam pairs.

3. A scheduling request transmission method comprising:

obtaining, by a terminal device, a scheduling request (SR) resource configured by a network device for the terminal device carried on an uplink control channel; and obtaining, by the terminal device, a mapping relationship between the SR resource and a plurality of uplink beam pairs configured by the network device for the terminal device.

4. The method according to claim 3, further comprising, sending, by the terminal device, a scheduling request by using the plurality of uplink beam pairs and a corresponding SR resource.

5. The method according to claim 4, wherein, when a quantity of retransmission times of each SR corresponding to a plurality of uplink beams exceeds a maximum quantity of retransmission times, the terminal device releases all the SR resources.

6. The method according to claim 5, wherein the terminal device further initiates random access.

7. A network device comprising:

a processor adapted to: configure, for a terminal device, scheduling request (SR) resources carried on an uplink control channel, and when there are a plurality of SR resources, configure a mapping relationship between the SR resources and a plurality of available uplink beam pairs for the terminal device by mapping the plurality of SR resources to the plurality of uplink beam pairs, and notifying the terminal device of the mapping relationship between the plurality of SR resources and the plurality of uplink beam pairs; and a receiver adapted to receive a scheduling request sent by the terminal device by using the plurality of uplink beam pairs and a corresponding SR resource.

8. The network device according to claim 7, wherein the processor is further adapted to:

allocate the scheduling request SR resource carried on the uplink control channel to the terminal device.

9. The network device according to claim 8 further comprising:

a transmitter adapted to notify the terminal device of the allocated SR resource.

10. The network device according to claim 9, wherein, the processor is further adapted to map the SR resource to the plurality of uplink beam pairs; and the transmitter is further adapted to notify the terminal device of the mapping relationship between the SR resource and the plurality of uplink beam pairs.

11. A terminal device comprising:

a receiver adapted to: obtain a plurality of scheduling request (SR) resources configured by a network device for the terminal device carried on an uplink control channel; and obtain a mapping relationship between the plurality of SR resources and a plurality available uplink beam pairs configured by the network device for the terminal device from the network device; and a transmitter adapted to send a scheduling request by using the plurality of uplink beam pairs and a corresponding SR resource to the network device.

12. The terminal device according to claim 11, wherein, when a quantity of retransmission times of each SR corresponding to a plurality of uplink beams exceeds a maximum quantity of retransmission times, the terminal device releases all the SR resources.

13. The terminal device according to claim 12, wherein the terminal device further initiates random access.

* * * * *